COHERENT SIMULTANEOUS CROSS-CORRELATING SIGNAL SEPARATOR

Filed March 12, 1965 2 Sheets-Sheet 1

INVENTOR.
RUDOLF O. FAISS
BY [signature]
ATTORNEY

INVENTOR.
RUDOLF O. FAISS
BY
ATTORNEY

United States Patent Office 3,486,016
Patented Dec. 23, 1969

3,486,016

COHERENT SIMULTANEOUS CROSS-CORRELATING SIGNAL SEPARATOR

Rudolf O. Faiss, Mogadore, Ohio, assignor to Goodyear Aerospace Corporation, Akron, Ohio, a corporation of Delaware Filed Mar. 12, 1965, Ser. No. 439,353
Int. Cl. G06f *15/34;* G06g *7/19*
U.S. Cl. 235—181 7 Claims

ABSTRACT OF THE DISCLOSURE

An apparatus to separate desired harmonic sets of signals from background noise and from one another in a complex group of signals and noise. The apparatus converts the signal to an optical representation by light and passes the light through a mask which has a set of logical functions represented thereon by a plurality of transparent slits therein and extending substantially across the width thereof with the spacing of the slits being variable linearly from one side to the other of the mask so that at any line parallel to the edges of the mask, the spacing of the slits is exactly equal. A photosensitive paper is moved behind the mask with the light variations passing through the mask being detected by the paper so that reinforcement at particular points on the paper as they pass under the slits represents the frequency of the signal.

This invention relates to a coherent simultaneous cross-correlating signal separator, and more particularly to an apparatus to separate desired harmonic sets of signals from background noise and from one another in a complex group of signals and noise.

Heretofore it has been known that many times electrical or acoustic signals are so intermixed with background noise that it is impossible to achieve useful information. This problem is especially true with respect to discriminating radar or sonar information as the presence of multiple targets, overlapping frequencies and background noise presents a very confusing picture.

Therefore, it is the general object of the present invention to avoid and overcome the foregoing and other difficulties of and objections to prior art practices by the provisions of a processing system for a complex input signal, composed of disorganized individual frequency components, which system sorts out the harmonic sets to solve the detection problem in a relative short scaled period of time.

A further object of the invention is to provide a processing system for a complex input signal which creates the option of looking at each harmonic set separately as well as simultaneously to get a total look at all the harmonic sets of the input group of signals.

A further object of the invention is to provide a processing system for complex signals which sorts out the harmonic sets and at the same time increases the signal to noise ratio.

A further object of the invention is to provide a cross correlation technique to separate harmonics from noise in a complex signal.

The aforesaid objects of the invention and other objects which will become apparent as the description proceeds are achieved by providing a processing system for a complex group of signals which includes the combination of light modulator means to linearly convert the amplitude variations of the complex group of signals to light intensity variations, a mask receiving the light intensity variations over the width thereof, the mask having a plurality of transparent slits therein extending substantially across the width thereof with the spacing of the slits spaced linearly from one side to the other side of the mask to define a set of periodic impulse functions as transmittance analogues distinguished by their fundamental period, a film positioned in adjacent relationship to the mask opposite the light modulator means and adapted to move at a constant linear speed relative to the mask to cross correlate the complex group of signals as the light intensity variations are recorded on the film means through the slits in the mask, means to develop the exposed film, means to scan the developed film to obtain an electrical and optical readout signal of the periodic impulse functions stored as information on the film, and means to utilize the electrical and optical readout signal to display the information recorded on the film.

For a better understanding of the invention reference should be had to the accompanying drawings, wherein.

Although the invention is applicable to separating complex signals composed of wave forms of various types such as heat, electromagnetic, mechanical, or acoustic, the invention has been primarily designed to be used as an acoustical complex signal separator, and hence it has been so illustrated and will be so described.

Figure 1:
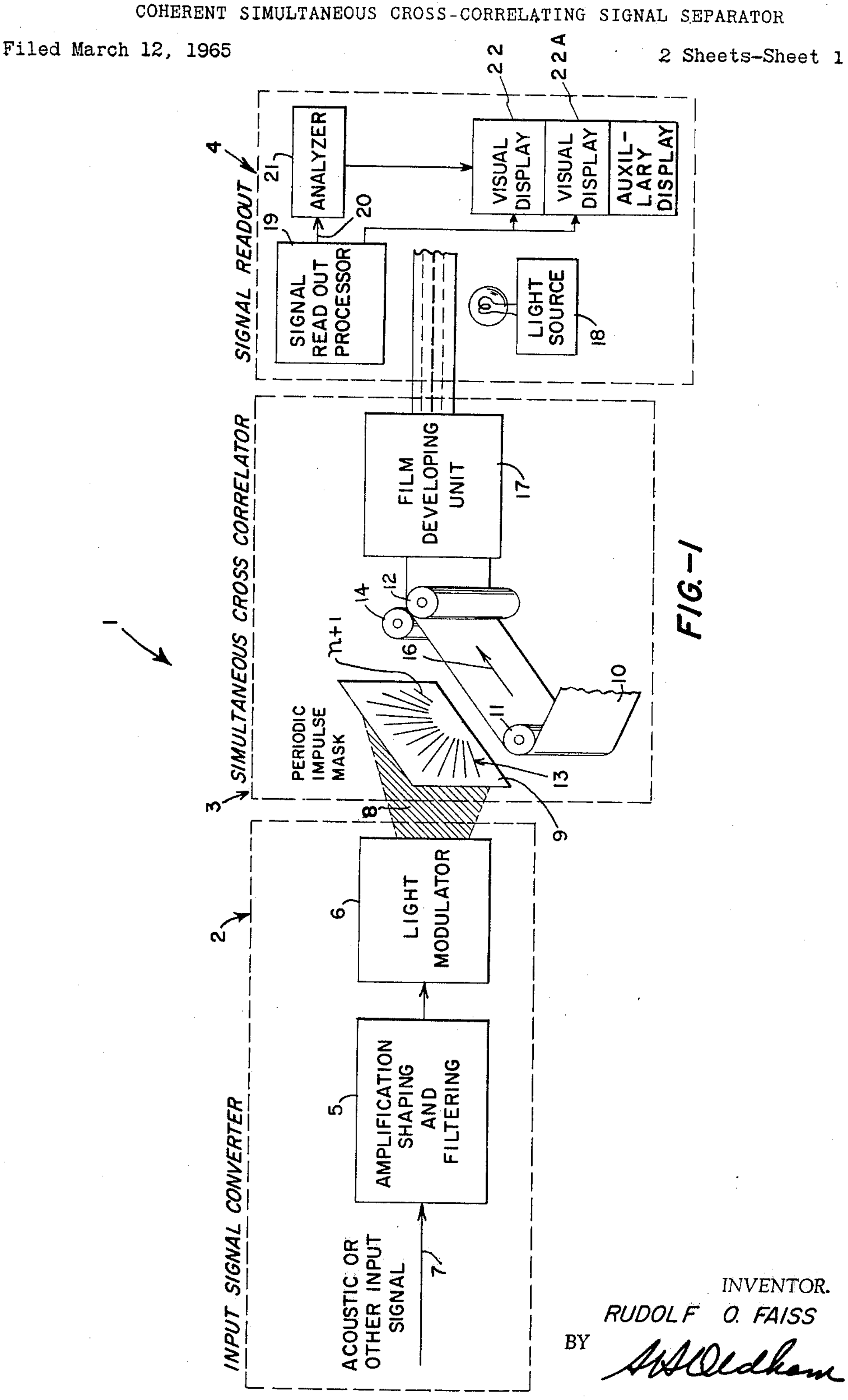
FIGURE 1 is a schematic block diagram of an apparatus representing one embodiment of the invention.

With reference to FIGURE 1 of the drawings, the numeral 1 indicates generally a proposed signal processing system comprising three basic components, namely, an input signal converter surrounded by dotted lines, and indicated generally by numeral 2, a simultaneous cross correlator surrounded by dotted lines, and indicated by numeral 3, and a signal readout surrounded by dotted lines, and indicated by numeral 4. These basic systems in combination achieve the objects of the invention, although it should be understood that the simultaneous cross correlator 3 comprises the essential part of the invention and that the other systems are substantially conventional. A description of each system follows hereinafter.

The input signal converter 2 consists of an amplification, shaping and filtering component 5 and a light modulator 6. A complex acoustic input signal 7, such as generally picked up in passive listening by a sonar receiver, is introduced into the amplification and filtering component 5 where it is amplified, shaped and filtered in a conventional manner so that the signal to be correlated will pass through the remaining electronic components of the system in an optimum manner. This might consist of clipping both very low and very high signals, and presenting other peaked pulses as square or sawtooth waveforms upon amplification which cooperate better with electronic components, expecially for frequency analysis. The amplified signal from the component 5 is converted linearly to light intensity variations by the light modulator 6 to produce a modulated light output 8. In effect the signal simply drives the light. Hence, the input acoustic signal is changed linearly to an optical light signal. The modulated light output 8 is directed so as to illuminate evenly the entire surface of a mask 9 in the simultaneous cross correlator 3. In addition to the mask 9, the simultaneous cross correlator 3 will include a film 10 which is of characteristics sensitive to the light output 8 mounted around rollers 11 and 12 so as to be substantially parallel to and adjacent the mask 9 in the path of the light output 8 passing through a plurality of transparent slits, indicated generally by numeral 13. in the mask 9. The film is driven around the rollers 11 and 12 by any convenient precision means, such as a drive roller 14 in close spaced parallel relation to roller 12 which imposes a friction drive acting on the film 10. However, other drive systems might be utilized such as suitable conveyor with a vacuum clamping of the film to the conveyor.

As an important feature of the invention the film must move at a constant speed, so to this end the roller 12 would be rotated at the desired precise speed in order to move the film 10 linearly in a direction indicated by the arrow 16 to achieve the cross correlation technique described hereinafter. Each point of the film 10, after $(n+1)$ exposures, is moved into a film developing unit 17 where it is developed and sent on to the signal readout 4 in about 5 to about 60 seconds after passing the final slit $n+1$ of the mask 9. This developing time presumes the use of photographic film. Other recording media, such as photochromic film, and thermosplastic film used with an electron gun, are possible.

The readout section contains a DC light source 18 which projects light through the developed film. The light passing through the film is detected by a signal readout processor 19. The signal readout processor 19 produces both an electrical signal 20 by suitable photo diodes, or the like which may be used as an input to an analyzer 21 with the analyzer 21 feeding an electrical visual display 22, and a light signal by simple optical lenses, and the like which may be used to drive an optical visual display 22A. As the film 10 moves, the transmittance of light from source 18 through the film will change and proportionately vary the light intensity onto the signal readout processor 19. These variations will be converted by the signal readout processor 19 into electrical signals, which are amplified, filtered, and maybe analyzed in the analyzer 21 before being sent to the visual display 22. The variations will also be treated optically by the signal readout processor and then transmitted directly to the optical visual display 22A. The analyzer 21 may be manually controlled to show harmonics separately as well as to show all harmonics simultaneously depending upon the desired operation. These types of waveform analyzers are well known in the art. Further, it is contemplated that auxiliary outputs will be available for use as inputs to spectrum analyzers, monitoring oscilloscopes, and speakers for aural monitoring.

Figure 2:
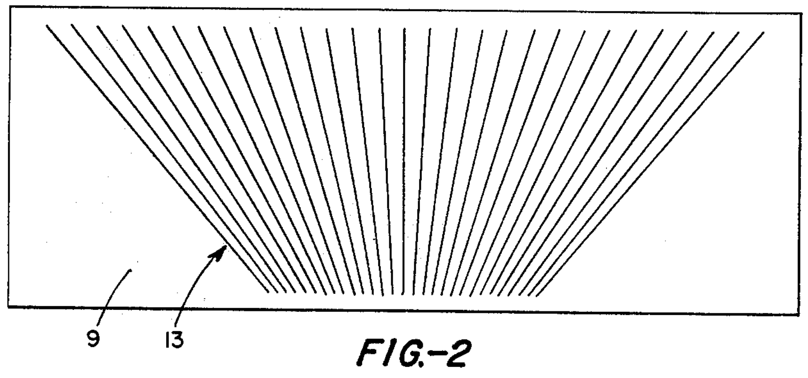
FIGURE 2 is a plan view of the mask of local functions of FIGURE 1 showing the relationship of the plurality of slits therein.

With reference to FIGURE 2, the mask 9 containing the plurality of slits 13 is shown in an enlarged plan view. It should be understood that the mask 9, which stores a particular family of periodic impulse functions, consists of an opaque background traversed by the transparent slits 13. Obviously, different masks must be used to sort input signal in different ways, thus enhancing the flexibility of the system. However, of course, the input light or electrical intensity variations might be appropriately varied or multiplied to eliminate the need change the mask for each different group of periodic functions. The spacing between the slits varies linearly from the top to the bottom of the mask 9, or from one long side to the other long side as indicated. It is contemplated that the mask 9 will be substantially rectangularly shaped and, as stated heretofore, the film will move at a constant linear speed behind the mask so the light intensity variations will be recorded on the film through the silts. For a given film speed the spacing between the slits at the top of the mask will correspond to the period of some lowest fundamental frequency while the narrow slit spacing at the bottom of the mask will correspond to the period of some highest fundamental frequency. Since the slit spacing varies linearly from the top of the bottom, the slit spacings will correspond to a continuous range of fundamental frequencies from the lowest to the highest ranges selected. In order to achieve the purposes of the invention the slit widths must be very narrow to enable the mask to serve as the storage medium for all harmonics of the various members of the set of periodic impulse functions which lie within the pass band for which the processor has been designed. Therefore, if there are periodic functions present in the coming signal, the impingement of the modulated light signal on the moving film through the mask simultaneously performs and records on the film the cross correlation of the periodic functions with the appropriate periodic impulse function between the range of the lowest and the highest frequencies as described by the slits 13 on the mask 9.

In order to achieve the above stated cross correlation, the mask 9 will have to meet two basic requirements of minimum practical slit width and dimensional accuracy. To simulate an impulse function perfectly the slit width should approach zero. However, a slit width equivalent to between about ⅕ and about $\frac{1}{20}$ of the period of the highest frequency that will be cross correlated will not significantly degrade the performance of the processor. For example, if the film velocity, V, is one inch per second, and the highest frequency that will be cross correlated is 200 c.p.s., then one period of the 200 c.p.s. wave form will be equivalent to 5 mils, and 0.5 mils will be an adequate slit width. The spacings between adjacent slits must be precise for each successive exposure of a point on the film to add in the manner described above. For the same reason, the distance between any and all the slits must be held quite accurately. Thus, it is seen that the spacing between slits on any longitudinal line should be exactly the same.

The invention contemplates alternate mask configurations to achieve different objectives, wherein slits or small holes, or a continuous change of transmittance might be used. Of course, as stated above, a different mask configuration must be utilized to represent different families of local functions. Nevertheless, the principal of utilizing a mask containing local functions to achieve a family of cross correlations with a desired signal function existing as a light intensity variation on a film moved relatively behind the mask will still be utilized.

Figure 3:
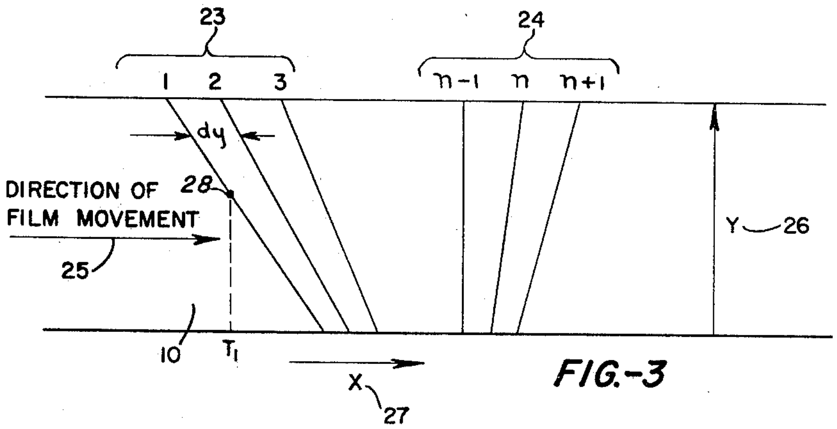
FIGURE 3 is a schematic diagram of the film illustrating its relative movement in relation to the mask of local functions.

In order to better understand the operation of the simultaneous cross correlator which utilizes the mask 9 and the moving film 10, reference should be had to FIGURE 3, where three numbered slits, indicated by numeral 23, indicate the first three slits in the mask and three lettered slits, indicated by numeral 24, represent the last three slits in the mask. The film 10 is moved relative to the slits, as indicated by the arrow 25. Thus, the direction across the film is Y, as indicated by numeral 26, and the direction across the length of the film is X, as indicated by numeral 27. The spacing of the slits at a Y level is $d_y$, where $d_y$ is a linear function of Y. Thus, consider a point 28 on the unexposed film which has a certain Y position and suppose this point reaches slit 1 at an arbitrary time, $T_1$. If the slits are uniformly lighted with an intensity that is proportional to the amplitude of the complex input signal being processed, and the slit widths are sufficiently small so that the exposure time of any point is small in comparison with the period of the highest frequency being considered, then the exposure at the point 28 will be essentially proportional to the signal intensity at the arbitrary time, $T_1$. The point 28 will receive additional exposure upon passing each subsequent slit in the mask. If the point 28 happens to lie in the Y position so that the time to traverse a $d_y$ spacing is exactly the fundamental period of the periodic signal portion of the complex input signal, the light caused by the periodic signal will be at the same intensity every time point 28 passes under a slit while the light caused by the noise will be added at random. Thus, each subsequent exposure adds to the previous ones resulting in $(n+1)$ exposures added at point 28 by the time point 28 is passed slit $n+1$ at the end of the mask. The sum of the exposures resulting from the periodic portion of the complex signal add up linearly so as to tend to produce a stronger replica of the periodic input portion of the signal. The sum of the exposures from the rest of total complex inputs signal adds together in a somewhat random manner so as to cause a near zero net effect.

Figure 4:
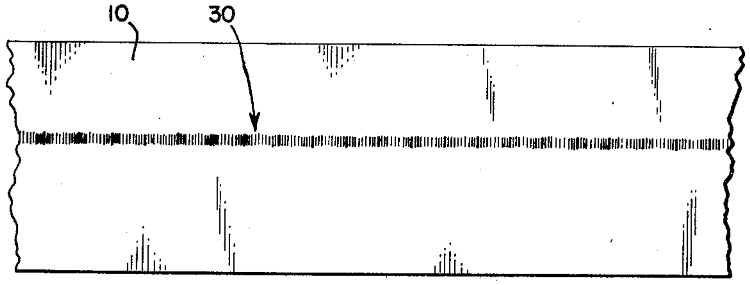
FIGURE 4 is a fragmentary plan view of a section of the film after it has been developed illustrating the resultant cross correlation functions and in particular a harmonic set which has been separated from the complex group of signals.

Therefore, the film 10, when developed, will appear somewhat as illustrated in FIGURE 4 wherein a plurality of dark spots, representing the replica of the periodic input portion of the signal indicated generally by numeral 30, disclose the fortified light exposure of a plurality of points 28 at their Y position on the mask. Thus, the complex signal has been cross correlated with all local functions and one of the resultant cross correlation functions should be a replica of the periodic signal portion of the complex input signal at a particular Y level of the film. It has been separated from the complex input signal. Likewise, if other periodic signals are present within the frequency band defined by the mask, they also will appear somewhat as the indication 30 in FIGURE 4 except at different Y levels. Thus, the mask groups the frequencies of the complex input signal into potential harmonic sets.

Further, it has been found that the signal to noise power ratio of the resultant separated signal, as indicated by line 30 in FIGURE 4, is improved directly proportional to the number of slits in the mask. Thus, it is desirable to have a high number of slits in the mask to maintain a high signal to noise ratio if the input signal is stable.

There are several features of the readout of the film information in the signal readout processor 19 which are important. As the film passes between the light source 18 and an aperture readout of the signal readout processor 19 the periodic cross correlation function or input signal existing at a certain Y level may be readout by itself. However, since thce cross correlation functions are distributed across the width of the film any number of individual cross correlation functions may be picked off simultaneously but separately. Although only one readout apparatus has been illustrated and described, it is to be understood that various other apparatus might be used to obtain different results or information as desired.

Thus, it is seen that a signal processing system employing cross correlation techniques has been described. The system consists of three basic sub-systems namely, (1) the input signal converter, (2) the simultaneous cross correlator which includes the "film" developing unit, and (3) the output signal readout including processor and display. The basic function of the input signal converter will be to convert the complex input signal amplitude variations to light intensity variations. In the simultaneous cross correlator the input signal in the form of light intensity variations will be recorded on a moving film through a mask that stores a family of local functions which in this application consists of a large number of transparent slits. The slits will be configured so that the mask will be equivalent to a continuum of impulse functions covering a range of fundamental periods. The operation of recording the signals on the moving film through the mask simultaneously performs and records the cross correlation of all periodic functions in the input signal with the periodic impulse functions, local functions, in this case stored on the mask. The output signal readout including the processor and display will include the apparatus for reading out the information on the film at the output of the simultaneous cross correlator, and all subsequent processing and display of the information as desired.

Besides the foregoing, the system will include the advantages of sorting signals into harmonic sets, reducing the noise level, retaining the wave shape and hence the phase information of the harmonic sets, and also creating the option of looking at each harmonic set individually as well as simultaneously to get a total look at all the harmonics of all the harmonic sets separately and simultaneously.

While in accordance with the Patent Statutes only one best known embodiment of the invention has been illustrated and described in detail, it is to be understood that the invention is not limited thereto or thereby, but that various modifications may be made to still fall within the objects of the invention.

What is claimed is:

1. In a processing system for a complex electrical input signal the combination of means to amplify and filter said signal so that it will have sufficient strength to pass the remaining equipment in the combination, light modulator means to convert the amplitude variations of the electrical signal to light intensity variations.

a shaped mask adapted to receive said light intensity variations over the surface thereof, said mask having a set of logical functions represented thereon by a plurality of transparent slits therein and extending substantially across the widths thereof with the spacing of said slits being variable linearly from one side to the other side of said mask, a film means positioned in adjacent relationship to said mask opposite to said light intensity variations and adapted to move at a constant linear speed relative to said mask so that the light intensity variations passing through said slits will be recorded on the film means, means to develop the exposed film means, means to scan the developed film means to obtain electrical readout signal of the information on the film means, and means to utilize the electrical readout signal to display the information on the film means.

2. In a processing system for a complex input signal consisting of harmonics and noise the combination of light modulator means to convert the amplitude variations of the signal to light intensity variations, a mask adapted to receive said light intensity variations over the surface thereof, said mask having a plurality of transparent slits therein and extending substantially across the widths thereof with the spacing of said slits being variable linearly from one side to the other side of said mask, said slits having a width equivalent to between about ⅕ to about $\frac{1}{20}$ of the period of the highest frequency expected to be processed, a film means positioned in adjacent relationship to said mask adapted to move at a constant linear speed relative to said mask so that the light intensity variations passing through said slits will be recorded on the film means, means to scan the film means to obtain a readout signal of the information on the film means, and means to display the readout signal.

3. A processing system according to claim 2 where the spacing between the slits at the top of the mask correspond to the period of some predetermined lowest fundamental frequency while the spacing of the slits at the bottom of the mask conform to some predetermined highest fundamental frequency.

4. A processing system according to claim 2 where the spacing between adjacent slits on a line parallel to the direction of film motion is the same distance.

5. A system according to claim 2 where the means to display the readout signal includes an analyzer which may selectively receive the signal and be controlled to show harmonic frequencies separately as well as to show all harmonic frequencies simultaneously.

6. A processing system according to claim 2 where the film means has a length of X-axis and a width or Y-axis, and the film means is moved along its length or X-axis, the X and Y-axes forming a rectangular coordinate system, and said mask positioned with its width along the Y-axis and its length along the X-axis.

7. A processing system for a complex input signal which comprises means to amplify and filter said signal to increase its strength, light modulator means to linearly convert the amplitude variations of the signal to light intensity variations, a mask having a length or X-axis and a width or Y-axis adapted to receive said light intensity variations over the surface thereof, said mask having a plurality of openings therethrough configured with respect to the X, Y reference axes thereof so the mask is equivalent to a continuum of impulse functions covering a range of fundamental periods with respect to a point moving relative to the mask at a uniform speed in parallelism to the X-axis thereof, a film for integrating input energy positioned in adjacent relationship to the mask so the mask is between said light intensity variations and the film, means to move the film at a constant linear speed relative to said mask and parallel to the X-axis thereof so the light intensity variations passing through the openings of the mask will be recorded on the film, means to develop the exposed film, means to scan the developed film to obtain an electrical readout signal of the information on the film means, and means to utilize the electrical readout signal to display the information on the film.

References Cited

UNITED STATES PATENTS

| | | | |
|---|---|---|---|
| 3,204,248 | 8/1965 | Alexander | 235—181 X |
| 3,358,149 | 12/1967 | Preikschat | 235—181 X |
| 2,712,573 | 7/1955 | Vilbig | 179—100.3 |
| 2,898,401 | 8/1959 | McLucas | 179—100.3 |
| 3,372,383 | 3/1968 | Konen et al. | 340—173 |
| 3,388,240 | 6/1968 | Robbins | 235—181 |

OTHER REFERENCES

Cutrona et al.: Data Processing by Optical Techniques, 1959 Conference Proceedings, 3rd Nat. Convention on Milit. Electronics in Washington, D.C., pp. 23–26.

MALCOLM A. MORRISON, Primary Examiner

F. D. GRUBER, Assistant Examiner

U.S. Cl. X.R.

179—100.3; 250—217, 219; 324—77; 340—3, 173; 343—5; 356—71